United States Patent [19]

Espenan

[11] Patent Number: 4,975,187
[45] Date of Patent: Dec. 4, 1990

[54] FILTER MODULE INCLUDING A BAFFLE FOR PROTECTING A BUNDLE OF FILTER FIBERS

[75] Inventor: Jean-Michel Espenan, Toulouse, France

[73] Assignee: Lyonnaise Des Eaux, Paris, France

[21] Appl. No.: 436,319

[22] Filed: Nov. 14, 1989

[30] Foreign Application Priority Data

Nov. 21, 1988 [FR] France ................... 88 15098

[51] Int. Cl.$^5$ ............................................ B01D 63/02
[52] U.S. Cl. ................... 210/321.89; 210/456; 210/500.23
[58] Field of Search ............ 210/456, 321.8, 321.81, 210/321.89, 321.90, 500.23

[56] References Cited

U.S. PATENT DOCUMENTS

| 4,380,460 | 4/1983 | Otstot et al. | 210/456 X |
| 4,678,573 | 7/1987 | Otstot et al. | 210/456 X |

*Primary Examiner*—Frank Spear
*Attorney, Agent, or Firm*—Amster, Rothstein & Ebenstein

[57] ABSTRACT

A filter module comprises a bundle of filter fibers mounted in a housing. The bundle is provided with a heat-shrink sheath placed over a sleeve containing the bundle, with the sheath being placed level with lateral inlet/outlet orifices through the housing so as to act as a baffle against incoming liquid.

3 Claims, 1 Drawing Sheet

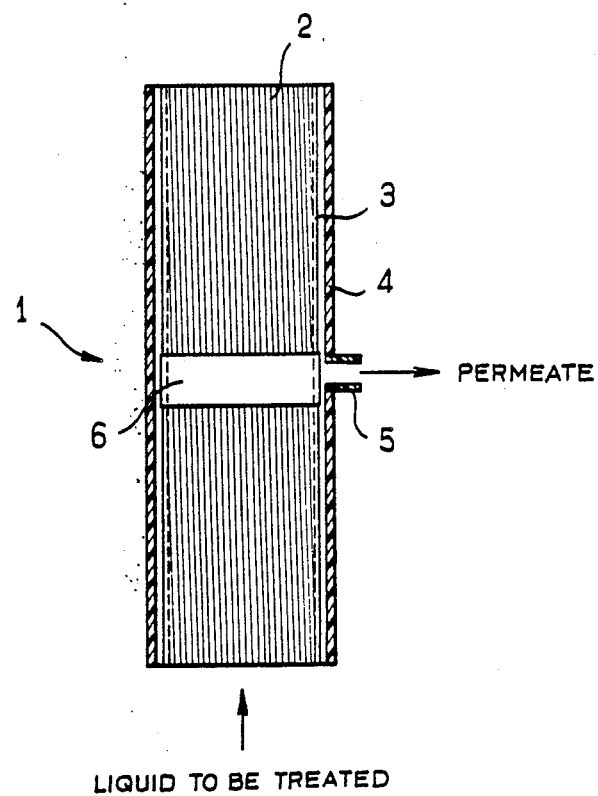

FILTER MODULE INCLUDING A BAFFLE FOR PROTECTING A BUNDLE OF FILTER FIBERS

The present invention relates to baffles for protecting bundles of filter fibers.

BACKGROUND OF THE INVENTION

Filter fibers or tubular membranes are mounted, in the form of cylindrical bundles whose ends are potted in resin plates, inside housings provided with lateral inlet or outlet orifices, and with the assembly constituting a filter module. The outlet orifices are also used for applying liquid backpressures in order to backwash the fibers, thus in all cases it is necessary to provide protective baffles at the orifices in order to avoid damaging fibers which are fragile in structure.

Installing baffles in a housing or making housing heads that include baffles is complex and expensive.

SUMMARY OF THE INVENTION

According to the invention, the problem is solved by using a heat-shrink sheath as a baffle, said sheath surrounding the bundle of fibers over a relatively short portion of their lengths level with the orifice (s), the sheath being placed on a sleeve surrounding the bundle.

The invention thus provides a filter module comprising a bundle of filter fibers mounted in a housing, wherein the bundle is provided with a heat-shrink sheath placed over a sleeve containing the bundle, with the sheath being placed level with the lateral orifices through the housing so as to act as a baffle, and most advantageously the invention provides a module in which the bundle has a single heat-shrink sheath about halfway along its length and level with a single lateral orifice.

BRIEF DESCRIPTION OF THE DRAWINGS

An embodiment of the invention is described by way of example with reference to the accompanying drawing which is a diagram of a filter module in accordance with the invention.

DETAILED DESCRIPTION

A filter module 1 comprises a bundle of hollow filter fibers 2 conventionally mounted in a rigid sleeve 3 made of widely perforated plastic material and potted at at least one end in a resin tube plate (not shown in the figure). The bundle 2 may itself be subdivided into a plurality of elementary bundles, connected by potting in a single tube plate. The entire assembly is contained in a molded plastic housing 4. The figure shows the case where the liquid to be treated enters via the ends of the fibers and the permeate (filtered liquid) leaves laterally via a single orifice 5 (which serves as the inlet orifice during back-washing), but naturally, depending on the structure of the fibers, the flow direction could be reversed, in which case the liquid would enter laterally and would leave via the ends of the fibers.

In order to protect the fiber structure, a heat shrink sheath 6 is placed around the sleeve 3 level with the orifice 5 and extending over that length of the sleeve which is struck by the incoming liquid. The sheath is put into place on the sleeve and is heat-shrunk prior to inserting the bundle of fibers inside the sleeve, since the temperature required for heat-shrinking could damage heat-sensitive polymer fibers.

It is advantageous, particularly with respect to cost, for the heat-shrink sheath to be constituted by a heat-shrink sheath of the kind commercially available for shrinking onto electrical wires and cables or for protecting rotary cylinders.

An additional advantage of using such a heat-shrink sheath is that while it is shrinking it comes into intimate contact with the surface of the sleeve 3 which, by virtue of its perforated structure, is corrugated in regular manner. As a result the sheath is locked in position on the sleeve and there is no danger of it sliding as would otherwise happen between two plastics. The sheath is thus accurately positioned on the sleeve and thus relative to the orifice under consideration.

In order to limit the head loss due to the sheath, which head loss is already small, the portion of the sheath which is not directly exposed to the jet of liquid, i.e. the portion at the back of the sleeve relative to the orifice 5, may be perforated or pierced, using one or more openings of any shape or size.

Such a sheath is very useful for modules having a single lateral orifice, however it may naturally be used at the level of any orifice. It is within the knowledge of the skilled man in the art to select the size of the sheath depending on the diameter of the fiber bundle and sleeve.

I claim:

1. A filter module comprising a bundle of filter fibers mounted in a housing with lateral inlet or outlet orifices, wherein the bundle is provided with a heat-shrink sheath placed over a sleeve containing the bundle, with the sheath being placed level with the lateral orifices through the housing so as to act as a baffle against incoming liquid.

2. A filter module according to claim 1, wherein the bundle has a single heat-shrink sheath about halfway along its length and level with a single lateral orifice.

3. A module according to claim 1, wherein that portion of the heat-shrink sheath which is not exposed to liquid inflow is itself perforated.

* * * * *